Patented Mar. 5, 1935

1,993,276

UNITED STATES PATENT OFFICE 1,993,276

PROCESS OF MANUFACTURING RUBBER COMPOSITIONS

Edward Arthur Murphy and Alfred Niven, Erdington, Birmingham, England, assignors to Dunlop Rubber Company, Limited, a British corporation No Drawing. Application February 11, 1932, Serial No. 592,438. In Great Britain February 20, 1931

3 Claims. (Cl. 106—23)

This invention relates to improvements in the manufacture of rubber compositions, and has for its object a process for bonding granular fibrous or divided materials such as leather fibre, asbestos fibre, wood pulp, wood flour, jute fibre, cotton flock, paper pulp, abrasives and cork.

According to the present invention the process for the bonding of the granular, fibrous or divided materials aforesaid comprises mixing these materials with aqueous dispersions of the kind hereinafter specified, which have been or which are thereafter converted into dispersions of granular precipitates in the manner hereinafter described.

If desired, these admixtures of fibrous materials and the dispersions of granular precipitates can be consolidated by filtration preferably over a filtering surface of suitable form through which passes the major portion of the water content.

Furthermore, these admixtures of fibrous materials and granular precipitates, if desired, need only be partially concentrated by filtration to form a paste which may be stored and subsequently be rediluted for use.

The aforesaid dispersions of granular precipitates are produced by a process which comprises effecting the coagulation of the aqueous dispersions hereinafter specified by precipitating in situ in the presence of a relatively large quantity of water one or more compounding ingredients in substantial proportion to the dry rubber content and of a nature hereinafter described, by the interaction or double decomposition of one or more water soluble reagents having normally no coagulating effects upon the aforesaid dispersions, with one or more water soluble reagents an ion or ions of which may incidentally possess coagulating influence subsequently added thereto, whereupon the aforesaid dispersions are transformed into dispersions of granular precipitates.

Examples of the water soluble reagents of the first class having normally no coagulating effects upon the dispersions are—carbonates, sulphates, silicates of the alkali metals or of ammonium.

Examples of the water soluble reagents of the second class which interact with the water soluble reagents of the first class to produce insoluble compounding ingredients are soluble salts of magnesium, aluminium, calcium, barium or zinc; sodium silicate also falls into this class if the corresponding reagent in the first class is such as to precipitate silicic acid—e. g. ammonium carbonate.

By a suitable choice of the reagents and consequent reaction products dispersions of varying consistency can be formed.

If desired the granular precipitates can be washed free from soluble reaction products such as soluble sulphates or chlorides by known means such as filtration and washing prior to their consolidation.

Numerous substances are capable of being used as compounding ingredients, for example, carbonates of magnesium, calcium and zinc may be prepared from sodium carbonate and sulphates or chlorides of these metals. Similarly the silicates of magnesium and zinc can be prepared from sodium silicate and the corresponding sulphate or chloride.

Mixtures of precipitates may be prepared and the reactions may be chosen in such a manner that only one soluble reaction product results for two insoluble products, for example, the reaction between one equivalent of sodium carbonate and one of magnesium sulphate followed by one equivalent of barium chloride yields only one equivalent of sodium chloride for two equivalents of mixed precipitate. In this manner a large yield of precipitate may be obtained relative to the amount of soluble salt formed.

The reagents may be added in the form of their aqueous solutions and may contain protective colloids such as glue or gum acacia, in solution, to increase the fineness of subdivision of the precipitated compounding ingredients.

The rate at which coagulation takes place after the introduction of the water soluble reagents of the second class may be controlled by the addition of suitable substances, for example, casein.

The emulsions or dispersions of rubber or the like comprise those consisting of rubber, guttapercha, balata or similar vegetable resins occurring naturally or artificially obtained. Such artificial aqueous dispersions may include those of coagulated rubber, vulcanized rubber, synthetic rubber, waste or reclaim.

If desired, any of the aforementioned dispersions may be used alone or in admixture with one another. Any of the aforesaid dispersions may contain the usual known compounding and vulcanizing ingredients and/or may be in concentrated form.

Concentrates such as are obtained in U. S. Patent 1,846,146, Feb. 23, 1932 and in British Patent 219,635 to which may be added any one or more of the usual compounding ingredients, may also be used.

The aforesaid vulcanizing and other compounding ingredients which are added in the form of their dispersions may be added to the aforesaid aqueous emulsions or dispersions of rubber or the like prior or subsequent to the precipitation of the granular dispersions.

It is preferable to add the aforesaid dispersions of the vulcanizing and other compounding ingredients before the precipitation of the granular dispersions.

As an example of one particular embodiment of the invention, the soluble reagent having no coagulating effect on rubber latex, as for instance sodium silicate, is mixed with the latex and the mixture is then stirred into the aqueous dispersion of the fibrous materials. A solution of the second reacting substance is then added, this causes a combined precipitation of the rubber and insoluble reaction products throughout the dispersion of the fibrous materials. The sludge so obtained can be consolidated by filtration and thereafter dried and pressed. The degree of pressure applied and the temperature during pressing are adjusted to suit the particular type of material in each case. It is convenient to apply pressure hydraulically at a temperature not exceeding 50° C.

As an example of another embodiment of the invention, the granular dispersion of rubber or the like is first prepared and these dispersions are then admixed with dispersions of the fibrous materials. This admixture is filtered, dried and pressed. In this particular embodiment coagulated rubber is directly incorporated with the fibrous materials.

The following are given by way of example as to how to produce a compact homogeneous sheet of fibrous material bonded by the granular precipitates aforesaid.

*Example I*

A latex mixing of the following composition:—

| | Parts by weight |
|---|---|
| Rubber | 25 |
| Leather fibre | 75 |
| Colloidal magnesium Silicate | 5 |
| Casein | 1 | is prepared in the following manner.

2.4 parts by weight of casein in the form of a 5% aqueous ammoniacal solution are added to 100 parts of concentrated latex of 60% concentration produced by centrifugalization. 14.6 parts of sodium silicate in the form of a 5% solution are also added. 14.3 parts of magnesium sulphate as a 5% solution are then stirred in whereupon precipitation occurs. The granular precipitate of rubber and colloidal magnesium silicate is mixed with 5300 parts of aqueous dispersion of leather fibre having a 3.4% concentration.

The sludge thus obtained is placed on a filter base of the desired shape and dimensions and subjected to filtration aided by external pressure and suction. After the filtered material has been consolidated to a compact sheet it is placed in a warm air chamber to remove moisture and then subjected to further compression.

*Example II*

90 parts of asbestos fibre are thoroughly comminuted in 900 parts of water in which 24.3 parts of 50% commercial sodium silicate solution has been dissolved. 1 part of casein in the form of a 5% aqueous ammoniacal solution is added to 16.5 parts of latex (60% concentration). The latex is then well mixed with the asbestos suspension. 12.25 parts of magnesium sulphate, in the form of a 10% solution are then stirred in. The sludge produced is drained, compacted by filtration and subsequent pressure as hereinbefore described.

What we claim is:

1. A process for bonding granular fibrous or divided materials which comprises suspending material to be bonded in aqueous medium and forming in said medium a granular precipitate of rubber composition by adding to a rubber dispersion therein first a reagent having no coagulating or precipitating effect on the dispersed rubber, and adding thereto a second reagent which reacts with said first reagent to produce an insoluble inorganic compounding precipitate and to precipitate said rubber dispersion.

2. A process of bonding granular fibrous and other divided material which comprises suspending said material in an aqueous medium, mixing in said aqueous medium an aqueous dispersion of rubber, and adding to said medium first a reagent having no coagulating or precipitating effect on such rubber dispersion, and then a reagent reacting with said first reagent to form an insoluble inorganic compounding precipitate and to precipitate therewith the rubber of said dispersion, while said suspension of divided materials and said rubber dispersion are thoroughly mixed.

3. The process of bonding granular, fibrous or other divided material which comprises suspending said material in a relatively large proportion of water, adding to the suspension a relatively small quantity of alkali silicate, then a relatively small quantity of concentrated rubber latex stabilized with casein, and mixing it therewith, adding magnesium sulphate solution in proportion equivalent to said alkali silicate to form a precipitate of said suspended and dispersed materials, separating the resulting precipitate and compacting it by pressure.

EDWARD ARTHUR MURPHY.
ALFRED NIVEN.